United States Patent
Lee et al.

(10) Patent No.: US 9,578,675 B2
(45) Date of Patent: Feb. 21, 2017

(54) METHOD AND APPARATUS FOR CHANGING DISCONTINUOUS RECEPTION CYCLE IN WIRELESS COMMUNICATION SYSTEM

(71) Applicant: LG ELECTRONICS INC., Seoul (KR)

(72) Inventors: Sunyoung Lee, Seoul (KR); Youngdae Lee, Seoul (KR); Sungjun Park, Seoul (KR); Seungjune Yi, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/412,969

(22) PCT Filed: Jul. 8, 2013

(86) PCT No.: PCT/KR2013/006064
§ 371 (c)(1),
(2) Date: Jan. 5, 2015

(87) PCT Pub. No.: WO2014/010901
PCT Pub. Date: Jan. 16, 2014

(65) Prior Publication Data
US 2015/0195866 A1    Jul. 9, 2015

Related U.S. Application Data

(60) Provisional application No. 61/670,137, filed on Jul. 11, 2012.

(51) Int. Cl.
H04W 52/02    (2009.01)
H04W 76/04    (2009.01)
H04W 72/04    (2009.01)

(52) U.S. Cl.
CPC ....... *H04W 76/048* (2013.01); *H04W 52/0216* (2013.01); *H04W 52/0229* (2013.01);
(Continued)

(58) Field of Classification Search
CPC ... H04W 52/02; H04W 52/0203; H04W 84/12
See application file for complete search history.

(56) References Cited

U.S. PATENT DOCUMENTS 9,332,456 B2 *   5/2016   Heo .............. H04W 52/04
2008/0181127 A1  7/2008   Terry et al.
(Continued)

OTHER PUBLICATIONS

PCT International Application No. PCT/KR2013/006064, Written Opinion of the International Searching Authority dated Sep. 27, 2013, 1 page.
(Continued)

*Primary Examiner* — Hassan Phillips
*Assistant Examiner* — Prenell Jones
(74) *Attorney, Agent, or Firm* — Lee, Hong, Degerman, Kang & Waimey

(57) ABSTRACT

A method and apparatus for changing Discontinuous Reception (DRX) cycle in a wireless communication system is provided. A wireless device configures a short DRX cycle and a long DRX cycle. When a drx-ShortCycle timer expires, it is determined whether a drxInactivityTimer is run or not. Therefore, the wireless device uses one of the short DRX cycle and the long DRX cycle according to the determination. Discontinuous reception (DRX) cycle can be configured flexibly and a CSI report between the UE and the eNB can be complied with accurately.

14 Claims, 10 Drawing Sheets

(52) U.S. Cl.
CPC ....... *H04W 72/042* (2013.01); *H04W 72/048* (2013.01); *H04W 72/0413* (2013.01)

(56) References Cited

U.S. PATENT DOCUMENTS

| | | | |
|---|---|---|---|
| 2009/0181670 A1 | 7/2009 | Tseng | |
| 2009/0232054 A1 | 9/2009 | Wang et al. | |
| 2009/0238105 A1 | 9/2009 | Wu et al. | |
| 2009/0285141 A1 | 11/2009 | Cai et al. | |
| 2010/0037114 A1* | 2/2010 | Huang | H04L 1/1829 714/749 |
| 2010/0111010 A1 | 5/2010 | Wu | |
| 2011/0002281 A1* | 1/2011 | Terry | H04W 52/0216 370/329 |
| 2011/0026625 A1 | 2/2011 | Susitaival et al. | |
| 2011/0176513 A1 | 7/2011 | Yi et al. | |
| 2011/0199910 A1 | 8/2011 | Oh et al. | |
| 2011/0294491 A1* | 12/2011 | Fong | H04L 5/001 455/422.1 |
| 2012/0014304 A1* | 1/2012 | Cai | H04W 52/0251 370/311 |
| 2012/0113904 A1 | 5/2012 | Anderson et al. | |
| 2012/0120828 A1 | 5/2012 | Anderson et al. | |
| 2012/0157153 A1 | 6/2012 | Song | |
| 2012/0178445 A1* | 7/2012 | Dalsgaard | H04W 72/02 455/434 |
| 2012/0257559 A1 | 10/2012 | Kim et al. | |
| 2013/0114573 A1 | 5/2013 | Suzuki et al. | |
| 2013/0308507 A1* | 11/2013 | Wanstedt | H04W 52/0216 370/311 |
| 2014/0177570 A1* | 6/2014 | Yi | H04W 72/0413 370/329 |
| 2014/0185558 A1* | 7/2014 | Yi | H04W 24/08 370/329 |
| 2014/0241227 A1 | 8/2014 | Wu et al. | |
| 2015/0063155 A1* | 3/2015 | Suzuki | H04W 76/048 370/252 |
| 2015/0365915 A1* | 12/2015 | Suzuki | H04W 76/048 370/329 |

OTHER PUBLICATIONS

U.S. Appl. No. 14/413,191, Final Office Action dated Aug. 19, 2016, 13 pages.

* cited by examiner

METHOD AND APPARATUS FOR CHANGING DISCONTINUOUS RECEPTION CYCLE IN WIRELESS COMMUNICATION SYSTEM

CROSS-REFERENCE TO RELATED APPLICATIONS

This application is the National Stage filing under 35 U.S.C. 371 of International Application No. PCT/KR2013/006064, filed on Jul. 8, 2013, which claims the benefit of U.S. Provisional Application Ser. No. 61/670,137, filed on Jul. 11, 2012, the contents of which are all hereby incorporated by reference herein in their entirety.

TECHNICAL FIELD

The present invention relates to wireless communications, and more particularly, to a method and apparatus for changing a DRX cycle in a wireless communication system.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Discontinuous reception (DRX) is a method for reducing battery consumption by allowing a user equipment (UE) to discontinuously monitor a downlink channel. When the DRX is configured, the UE discontinuously monitors the downlink channel. Otherwise, the UE continuously monitors the downlink channel.

Recently, many applications require an always-on characteristic. Always-on is a characteristic in which the UE is always connected to a network so as to directly transmit data whenever necessary.

However, since battery consumption is great when the UE continuously maintains the network connection, a proper DRX is configured in a corresponding application to guarantee the always-on characteristic while reducing battery consumption.

Recently, several various applications are running in parallel in one UE, and thus it is not easy to configure one DRX suitable for all of the applications. This is because, even if an optimal DRX is configured for a specific application, it may be a not proper DRX configuration with respect to other applications which are running in parallel.

There is a need for a method for operating the DRX in a more flexible manner.

DISCLOSURE

Technical Problem

The present invention provides a method and apparatus for changing a DRX cycle in a wireless communication system.

The present invention also provides a method and apparatus for changing a DRX cycle in consideration of data transmission in a wireless communication system.

The present invention also provides a method and apparatus for controlling to not change to a long DRX cycle with restriction on DRX operation in a wireless communication system.

Technical Solution

In an aspect, a method for changing a DRX (Discontinuous Reception) cycle in a wireless communication system is provided. The method includes configuring a short DRX cycle and a long DRX cycle, determining whether a drxInactivityTimer is run when a drx-ShortCycle timer expires, and using one of the short DRX cycle and the long DRX cycle according to the determination.

The method may further include determining whether the drxInactivityTimer is running at a subframe n when a drx-ShortCycle timer expired at the subframe n.

The method may further include using the short DRX cycle if the drxInactivityTimer is running at the subframe n and choosing that at least one Channel Quality Indicator (CQI)/Precoding Matrix Index (PMI)/Rank Indicator (RI)/Precoding Type Indicator (PTI) on a Physical Uplink Control Channel (PUCCH) is reported at On Duration predetermined with the short DRX cycle.

In another aspect, a wireless device for changing a DRX (Discontinuous Reception) cycle in a wireless communication system is provided. The wireless device includes a radio frequency unit for receiving a radio signal, a processor, operatively coupled with the radio frequency unit, configured to configure a short DRX cycle and a long DRX cycle, determine whether a drxInactivityTimer is run when a drx-ShortCycle timer expires, and use one of the short DRX cycle and the long DRX cycle according to the determination.

Advantageous Effects

Discontinuous reception (DRX) cycle can be configured flexibly and a changing a DRX cycle in consideration of data transmission between the UE and the eNB can be complied with accurately. More details, the UE does not change to a long DRX cycle from a short DRX cycle when the data transmission is expected continuously. It can be advantaged that a CSI reporting can performed in consideration of data traffic when a DRX operation is configured for the UE.

MODE FOR INVENTION

Figure 1:
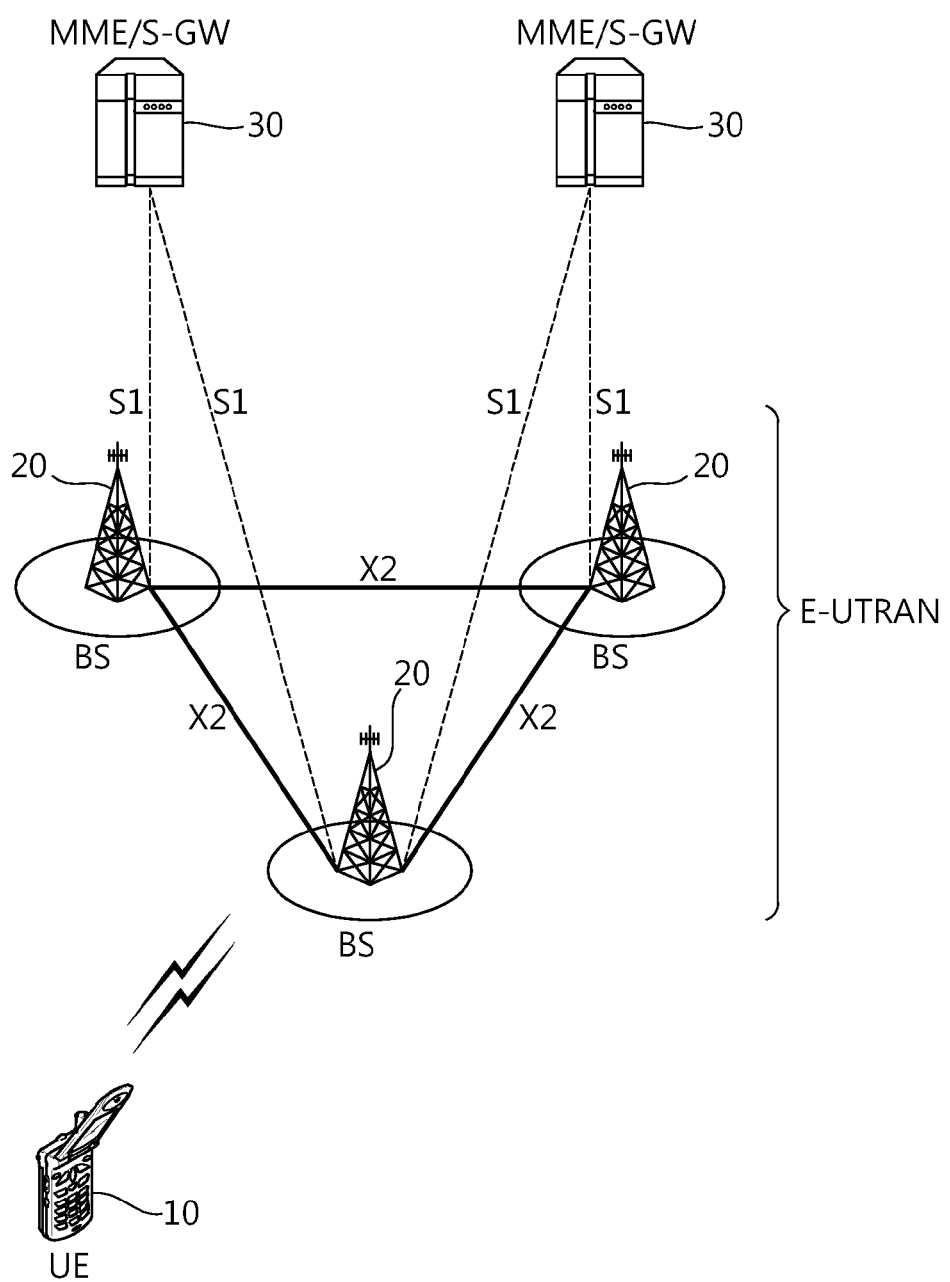
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
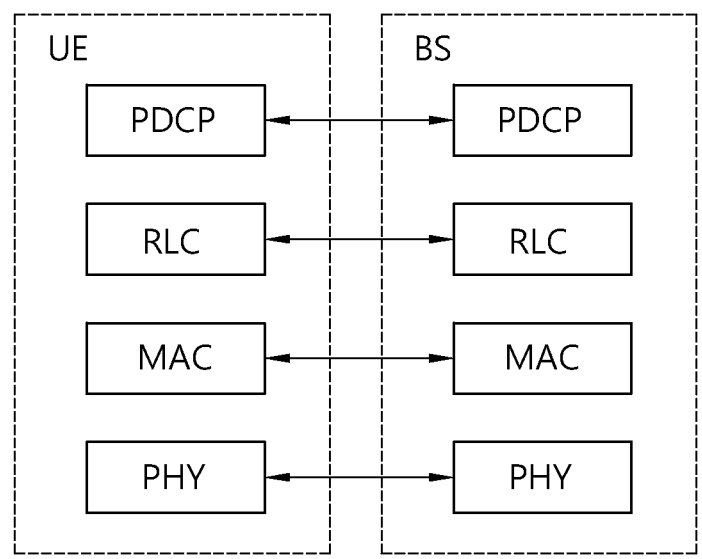
FIG. 2 is a diagram showing a radio protocol architecture for a user plane to which the present invention is applied.
Figure 3:
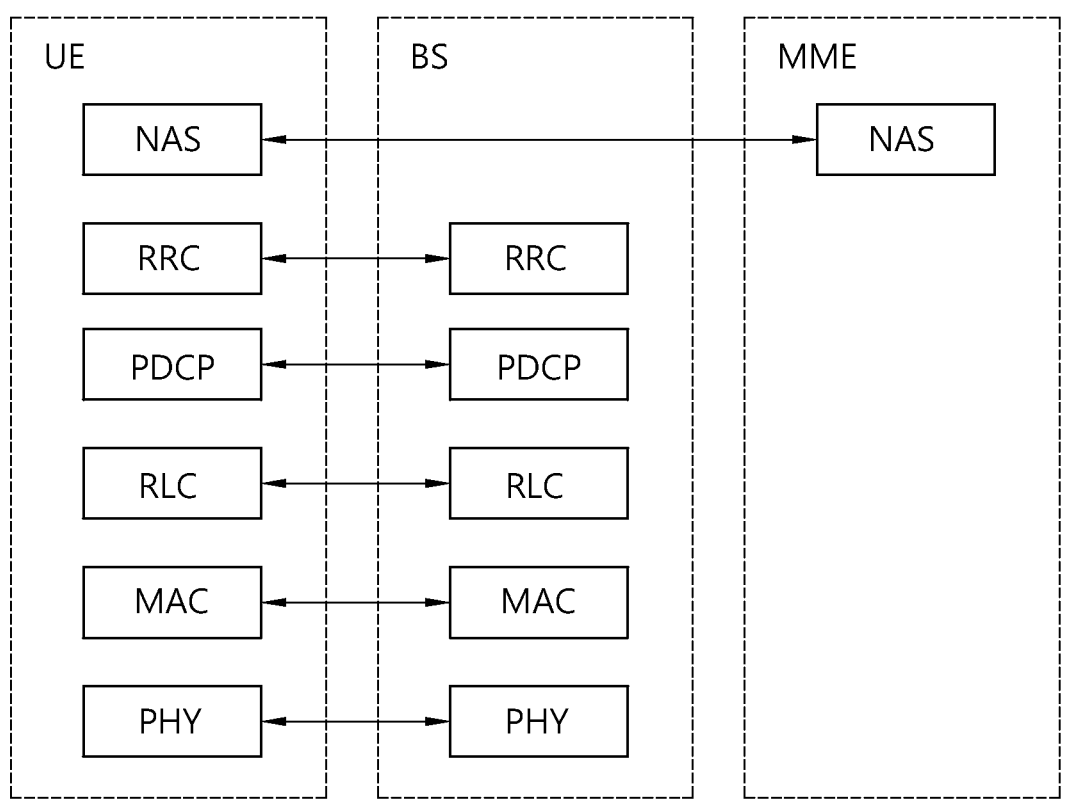
FIG. 3 is a diagram showing a radio protocol architecture for a control plane to which the present invention is applied to which the present invention is applied.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

The 3GPP LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

The PDCCH is a downlink control channel, and is also called a scheduling channel in a sense that it carries scheduling information. Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

The wireless communication system as 3GPP LTE of the present invention uses blind decoding for PDCCH detection. The blind decoding is a scheme in which a desired identifier is de-masked from a CRC of a PDCCH (referred to as a candidate PDCCH) to determine whether the PDCCH is its own channel by performing CRC error checking.

A BS determines a PDCCH format according to DCI to be transmitted to a UE. Thereafter, the BS attaches a cyclic redundancy check (CRC) to the DCI, and masks a unique identifier (referred to as a radio network temporary identifier (RNTI)) to the CRC according to an owner or usage of the PDCCH.

Now, discontinuous reception (DRX) in a wireless communication system, as example, 3GPP LTE will be described.

The DRX is a method for reducing battery consumption of a UE by allowing the UE to discontinuously monitor a downlink channel.

Figure 4:
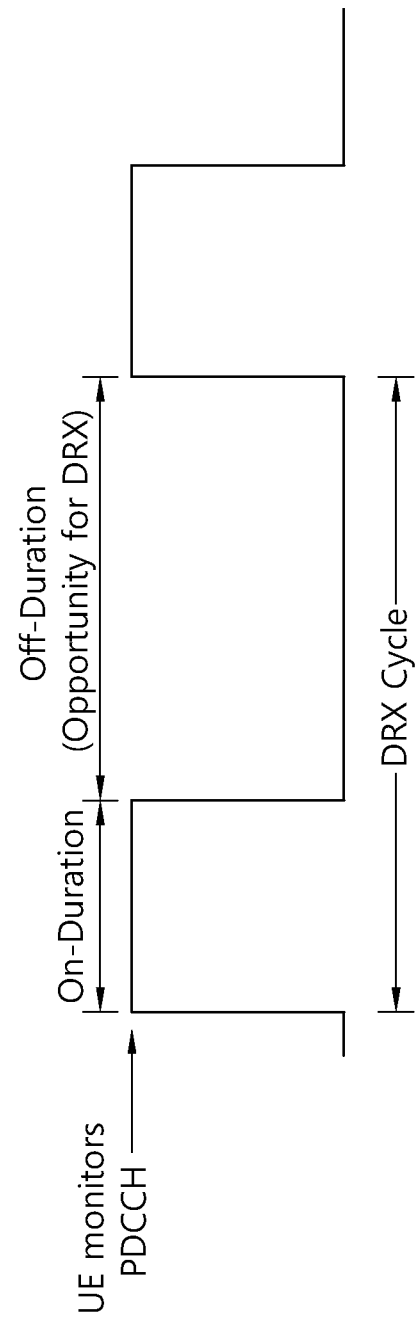
FIG. 4 shows a DRX cycle to which the present invention is applied.

FIG. 4 shows a DRX cycle to which the present invention is applied.

A DRX cycle specifies the periodic repetition of the on-duration followed by a possible period of inactivity. The DRX cyclic includes an on-duration and an off-duration. The on-duration is a duration in which a UE monitors a PDCCH within the DRX cycle. The DRX cycle has two types, i.e., a long DRX cycle and a short DRX cycle. The long DRX cycle which has a long period can minimize battery consumption of the UE. The short DRX cyclic which has a short period can minimize a data transmission delay.

When the DRX is configured, the UE may monitor the PDCCH only in the on-duration and may not monitor the PDCCH in the off-duration.

An onDuration timer is used to define the on-duration. The on-duration can be defined as a duration in which the onDuration timer is running. The onDuration timer may specify the number of consecutive PDCCH-subframe(s) at the beginning of a DRX Cycle. The PDCCH-subframe specifies a subframe in which the PDCCH is monitored.

In addition to the DRX cycle, a duration in which the PDCCH is monitored can be further defined. A duration in which the PDCCH is monitored is collectively referred to as an active time.

A drx-Inactivity timer deactivates the DRX. If the drx-Inactivity timer is running, the UE continuously monitors the PDCCH irrespective of the DRX cycle. The drx-Inactivity timer starts upon receiving an initial UL grant or DL grant on the PDCCH. The drx-Inactivity timer may specify the number of consecutive PDCCH-subframe(s) after successfully decoding a PDCCH indicating an initial UL or DL user data transmission for this UE.

A HARQ RTT timer defines a minimum duration in which the UE expects HARQ retransmission. The HARQ RTT timer may specify the minimum amount of subframe(s) before a DL HARQ retransmission is expected by the UE.

A drx-Retransmission timer defines a duration in which the UE monitors the PDCCH while expecting DL retransmission. The drx-Retransmission timer may specify the maximum number of consecutive PDCCH-subframe(s) for as soon as a DL retransmission is expected by the UE. After initial DL transmission, the UE starts the HARQ RTT timer. When an error is detected for the initial DL transmission, the UE transmits NACK to a BS, stops the HARQ RTT timer, and runs the drx-Retransmission timer. The UE monitors the PDCCH for DL retransmission from the BS while the drx-Retransmission timer is running.

An Active Time can include an on-duration in which the PDCCH is periodically monitored and a duration in which the PDCCH is monitored due to an event occurrence.

When a DRX cycle is configured, the Active Time includes the time while:
  onDuration timer or drx-Inactivity timer or drx-Retransmission timer or mac-ContentionResolution timer is running; or
  a Scheduling Request is sent on PUCCH and is pending; or
  an uplink grant for a pending HARQ retransmission can occur and there is data in the corresponding HARQ buffer; or
  a PDCCH indicating a new transmission addressed to the C-RNTI of the UE has not been received after successful reception of a Random Access Response for the preamble not selected by the UE.

Figure 5:
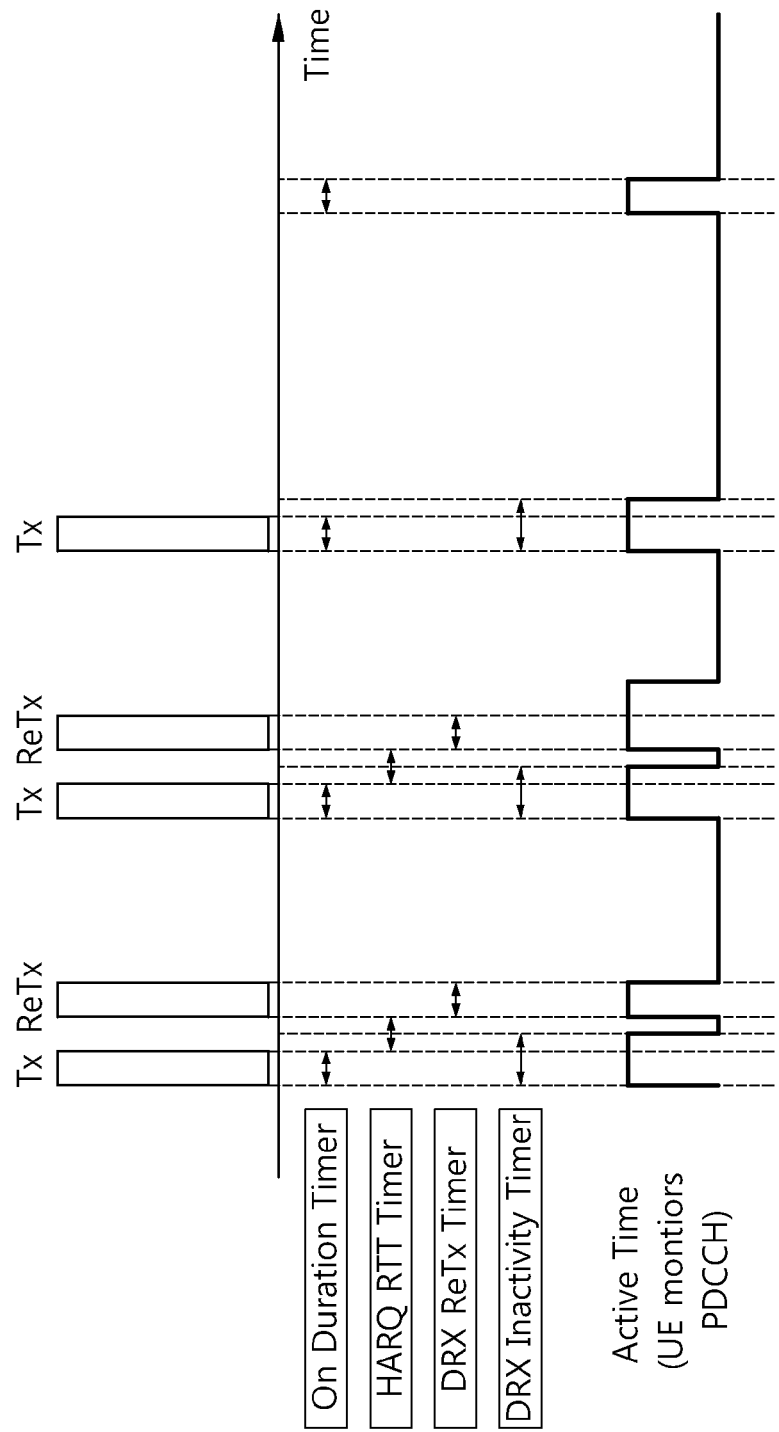
FIG. 5 shows active time for DRX operation to which the present invention is applied.

FIG. 5 shows active time for DRX operation to which the present invention is applied.

When DRX is configured, the UE shall for each subframe:
  if a HARQ RTT Timer expires in this subframe and the data of the corresponding HARQ process was not successfully decoded:
  start the drx-Retransmission timer for the corresponding HARQ process.
  if a DRX Command MAC CE (control element) is received:
  stop onDuration timer and drx-Inactivity timer.
  if drx-Inactivity timer expires or a DRX Command MAC CE is received in this subframe:
  if the Short DRX cycle is configured:
  start or restart drx-ShortCycle timer and use the Short DRX Cycle.
  else:
  use the Long DRX cycle.
  if drx-ShortCycle timer expires in this subframe:
  use the Long DRX cycle.
  If the Short DRX Cycle is used and [(SFN*10)+subframe number] modulo (shortDRX-Cycle)=(drxStartOffset) modulo (shortDRX-Cycle); or if the Long DRX Cycle is used and [(SFN*10)+subframe number] modulo (longDRX-Cycle)=drxStartOffset:
start onDuration timer.
during the Active Time, for a PDCCH-subframe, if the subframe is not required for uplink transmission for half-duplex FDD UE operation and if the subframe is not part of a configured measurement gap:
monitor the PDCCH;
if the PDCCH indicates a DL transmission or if a DL assignment has been configured for this subframe:
start the HARQ RTT timer for the corresponding HARQ process;
stop the drx-Retransmission timer for the corresponding HARQ process.
if the PDCCH indicates a new transmission (DL or UL):
start or restart drx-Inactivity timer.
when not in Active Time, type-0-triggered SRS shall not be reported.
if CQI masking (cqi-Mask) is setup by upper layers:
when onDurationTimer is not running, CQI/PMI/RI/PTI on PUCCH shall not be reported.
else:
when not in Active Time, CQI/PMI/RI/PTI on PUCCH shall not be reported.

As mentioned, the active-time is defined a total duration that the UE is awake. This includes the on-duration of the DRX cycle, the time UE is performing continuous reception while the inactivity timer has not expired and the time UE is performing continuous reception while waiting for a DL retransmission after one HARQ RTT. Based on the above the minimum active time is of length equal to on-duration, and the maximum is undefined (infinite).

Figure 6:
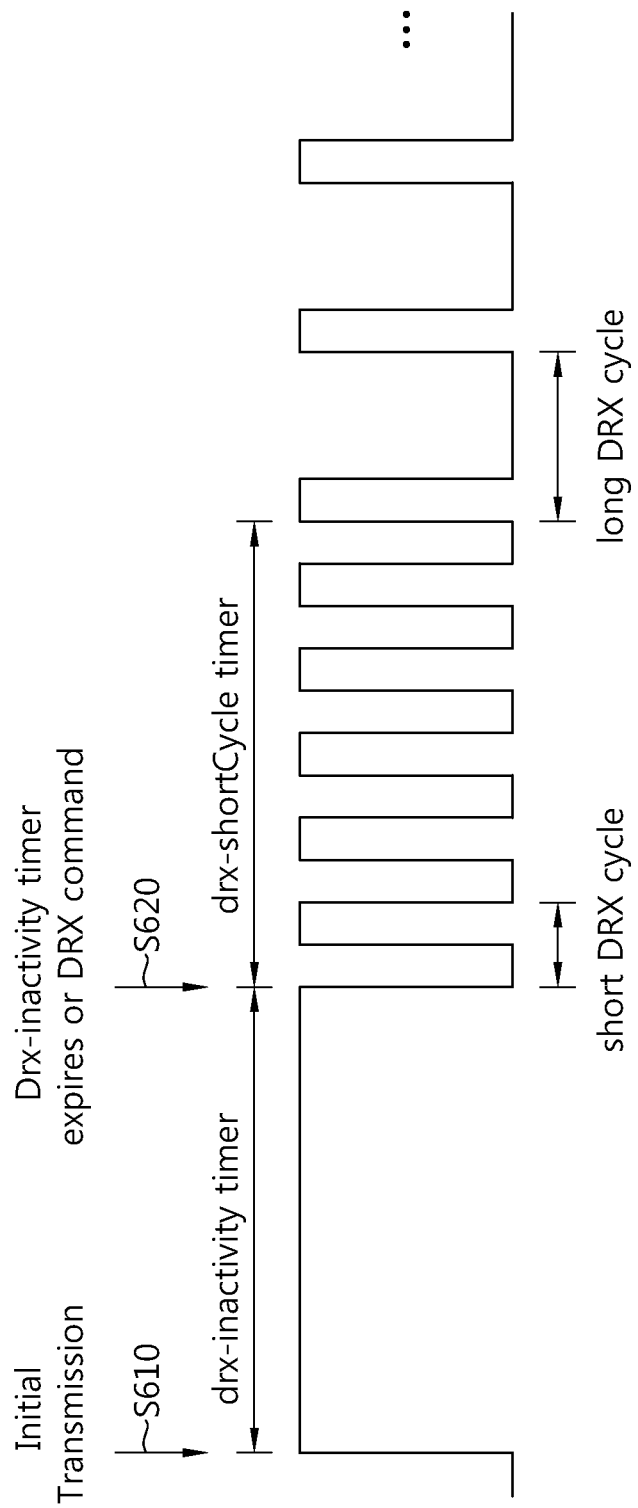
FIG. 6 shows an example of a transition of a DRX cycle to which the present invention is applied.

FIG. 6 shows an example of a transition of a DRX cycle to which the present invention is applied.

Upon receiving initial transmission from an eNB, a drx-Inactivity timer (also referred to as a first timer or an inactivity timer) starts (step S610). A UE continuously monitors a PDCCH while the drx-Inactivity timer is running.

If the drx-Inactivity timer expires or if a DRX command is received from the eNB, the UE transitions to a short DRX cycle (step S620). Then, the drx-ShortCycle timer (also referred to as a second timer or a DRX cycle timer) starts.

The DRX command can be transmitted as a MAC CE, and can be called a DRX indicator that indicates a transition to the DRX. The DRX command MAC CE is identified through a long channel ID (LCID) of a MAC PDU subheader.

While the drx-ShortCycle timer is running, the UE operates in the short DRX cycle. If the drx-ShortCycle timer expires, the UE transitions to a long DRX cycle.

If the short DRX cyclic is pre-set, the UE transitions to the short DRX cycle. If the short DRX cyclic is not pre-set, the UE can transition to the long DRX cycle.

A value of HARQ RTT timer is fixed to 8 ms (or 8 subframes). Other timer values (i.e., an onDuration timer, a drx-Inactivity timer, a drx-Retransmission timer, a mac-ContentionResolution timer, etc.) can be determined by the eNB through an RRC message. The eNB can configure the long DRX cycle and the short DRX cycle through the RRC message.

Figure 7:
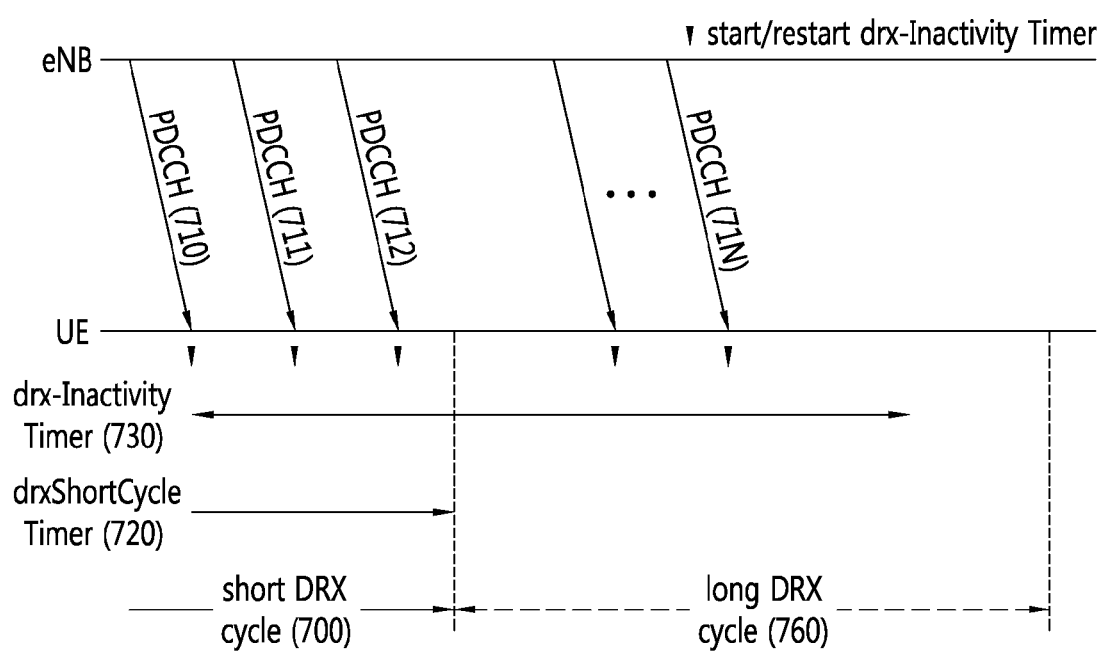
FIG. 7 shows an example of DRX operation with a Long DRX cycle which the wireless communication system is applied.

FIG. 7 shows a situation of DRX operation to which a wireless communication system is applied, i.e., the situation where the UE uses the long DRX cycle while receiving at least one PDCCH including information on radio resource allocation from the BS.

Referring to FIG. 7, the UE with DRX operation can be configured to transmit CSI report and periodical SRS to the BS according to a CSI configuration of the BS.

This means that the UE is configured to preform CSI and SRS transmission only at the subframe corresponding to the On Duration of the DRX cycle according to the DRX and CSI configuration of the BS. At this step, the BS transmits a RRC signal to set the UE to the configuration for a DRX operation and the configuration for CSI/SRS transmission. Also, the CSI transmission and SRS transmission are set by the BS, which are limited to the operation of the UE related to the CSI transmission with CQI masking (cqi-Mask) scheme and periodic SRS transmission. The CSI transmission includes a transmission of CQI/PMI/RI/PTI on a PUCCH, which is the configuration sets to transmit at On Duration of the DRX cycle. Also, the UE provides a uplink state by periodically sending a Sounding Reference Signal (SRS), and this periodic SRS transmission is called a type-0-triggered SRS. The SRS transmission according to the present invention includes the limitation to type-0-triggered SRS.

When the UE is configured to use both Short DRX Cycle (700) and Long DRX cycle (760) for the DRX operation, the UE starts a drx-shortCycle timer (720) when a drx-Inactivity timer expires (730), and the UE starts using the Long DRX cycle (760) if the drx-ShortCycle timer expires (720).

When the drx-ShortCycle timer is running, the UE will continuously resume the drx-Inactivity timer if the UE which uses the Short DRX cycle continuously receives at least one PDCCH including information on new radio resource allocation from the BS at the subframe in which the drx-Inactivity timer is running. However, since the drx-Inactivity timer does not expire because of the receiving at least one PDCCH continuously, the running the drx-Short-Cycle timer expires after predetermined time, and the UE finally transits from a Short DRX cycle to the long DRX cycle.

As a result, the UE transits the short DRX cycle to Long DRX cycle and uses the Long DRX cycle although it has to perform data transmission/reception by receiving radio resource allocation information continuously from the BS, it is caused the problem of not being able to perform the CSI transmission with sufficient frequency even if the UE is configured to transmit the CSI and SRS reports at the subframe corresponding to On Duration.

In addition, this problem causes difficulties with allocating radio resources correctly for the UE and making a low system performance in view of the BS. Therefore, this operation of the DRX is not proper and the DRX operation needs to be modified.

In consideration of this problem and in order to perform the CSI report and the SRS transmission with sufficient and correct frequency, the present invention is disclosed a solution for controlling the change of a DRX cycle considering the running of the drx-Inactivity timer when data transmissions on at least one PDCCH are expected.

Figure 8:
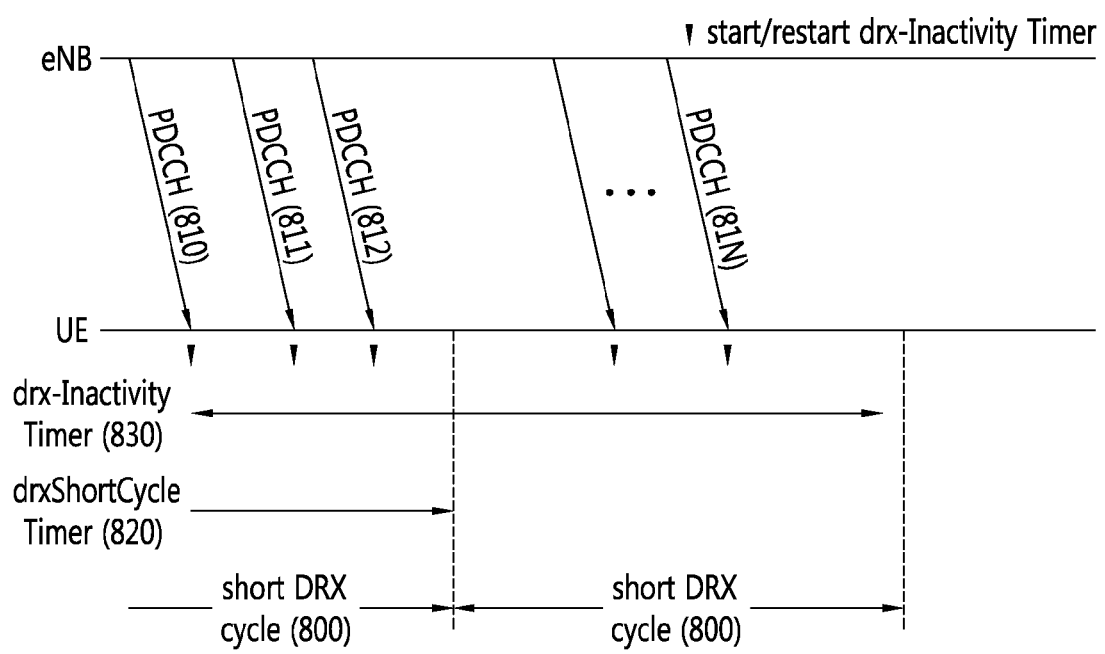
FIG. 8 shows an example of DRX operation with a short DRX cycle according to an exemplary embodiment of the present invention.

FIG. 8 shows an example of change DRX cycle according to an exemplary embodiment of the present invention.

Referring to FIG. 8, the UE is configured to use both the Short DRX Cycle and the long DRX cycle. If the UE which uses the Short DRX cycle continuously receives at least one PDCCH including information on radio resource allocation from the BS at the subframe in which a drx-Inactivity timer is running while drx-ShortCycle timer is running, the UE continuously resumes the drx-Inactivity timer, and when drx-ShortCycle timer expires accordingly (820), the UE starts to use the Short DRX cycle (800).

Figure 9:
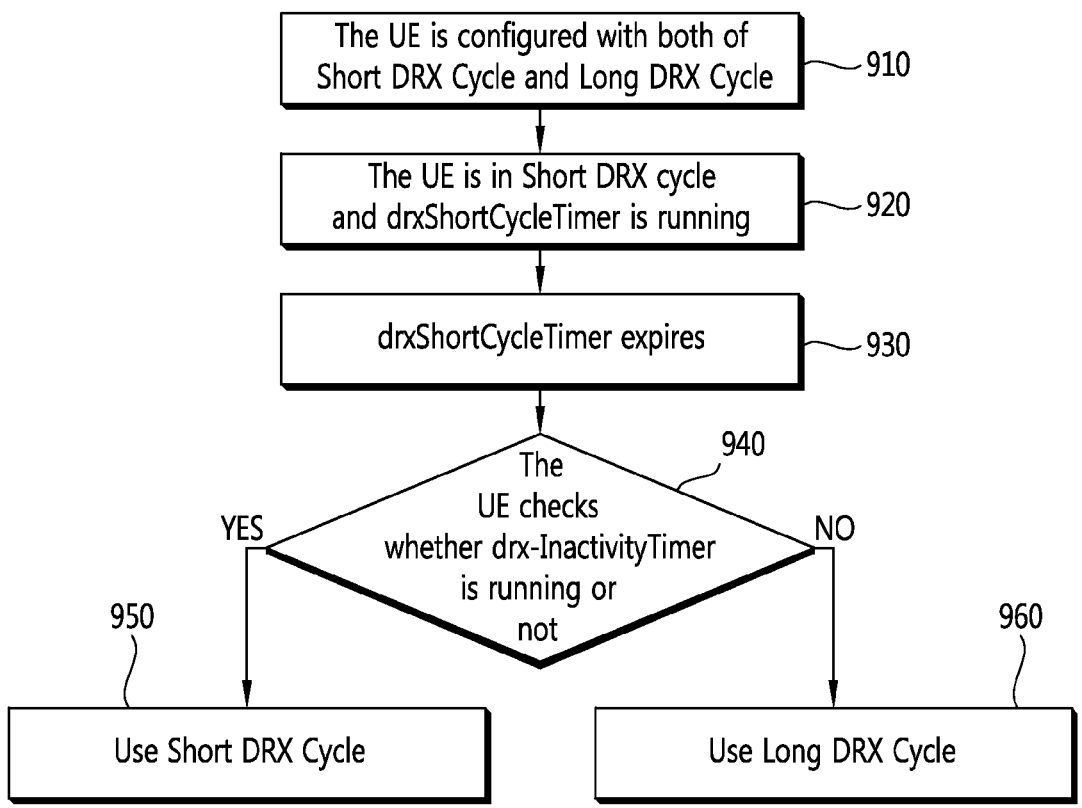
FIG. 9 shows a flowchart for changing a DRX cycle according to an exemplary embodiment of the present invention.

In relation to this situation, the operation of changing a DRX cycle will be described with reference to FIG. 9. FIG. 9 shows an example on the operation process of the UE according to the present invention, in which the DRX cycle is changed in consideration of running of a drx-Inactivity timer in the case where a drx-ShortCycle timer operated by the UE expires.

Referring to FIG. 9, the UE sets configurations related to a DRX configuration and a CSI reporting transmission. At this step, the UE can be configured to use the Short DRX cycle and the long DRX cycle with the DRX configuration (910). In order to set these configurations related to the DRX configuration and CSI transmission, the UE can receive a RRC signaling from the BS. In other words, the BS transmits the RRC signal to the UE in order to configure to use two types of DRX cycles such as the Short DRX cycle and the Long DRX cycle.

At this step, the UE can receive information on radio resource allocation from the BS through the PDCCH during the On Duration predetermined according to the DRX configuration. The UE uses the Short DRX cycle for the DRX operation and a drx-ShortCycle timer is running (920).

In the process described above, the UE checks whether the drx-Inactivity timer is running when the running the drx-ShortCycle timer expires in order to confirm whether data transmission for information on radio resource allocation is continuously received on at least one PDCCH from the BS. Therefore, transition to DRX cycle of UE can be controlled in consideration of the running of the drx-Inactivity timer when the running drx-ShortCycle timer expires (930).

The UE checks whether the drx-Inactivity timer is running at the subframe in which the drx-ShortCycle timer has expired (940). At this step, the UE transits to Long DRX cycle if the drx-Inactivity timer is not running (960), or keeps using the Short DRX cycle if the drx-Inactivity timer is still running (950).

In other words, the UE determines that the drx-Inactivity timer is running is that information on radio resource allocation for data transmission via PDCCH is continuously received from the BS. If the UE determines that information on radio resource allocation for the data transmission is continuously not received from the BS in the step of checking (940), it controls to not transit to the Long DRX cycle although the drx-ShortCycle timer has expired. In other words, the UE keeps using Short DRX cycle (950). Herein, the drx-ShortCycle timer does not start. Herein the term of start includes terms of restart or active. Whereas, if the drx-Inactivity timer is determined to be not running from the step of checking (940), the UE determines that information on radio resource allocation for new data transmission is not received via PDCCH from the BS.

Therefore, when the UE has determined a data transmission for information on radio resource allocation is not existed or not on the continuously received PDCCHs from the BS in the checking step, the UE controls to transit to the Long DRX cycle (960) or keep to the short DRX cycle (950). The checking step includes the drx-ShortCycle timer is expired or not and a state that the drx-Inactivity timer is running or not, as determination factor to change the DRX cycle.

The present invention, as described above, has restrictions to change of the Long DRX cycle when the drx-ShortCycle timer expires while the UE performs continuous data transmission/reception with the BS. More specifically, the UE controls to transit to the Long DRX cycle or the Short DRX cycle in consideration of the running of the drx-Inactivity timer when the drx-ShortCycle timer expires, it provides to enable more clear and proper DRX operation of the UE. Therefore, in the present invention, the UE keeps using the Short DRX cycle by not transiting to the Long DRX cycle when the UE which uses the Short DRX cycle is determined to be performing continuous data transmission with the BS, i.e. when there is continuous data transmission between the UE and the BS.

It is the advantage of performing CSI transmission and SRS transmission at the subframe corresponding to predetermined On Duration with sufficient frequency by performing DRX operation according to Short DRX cycle. Therefore, the present invention allows the BS to correctly acquire the information for performing radio resource allocation, thereby enhancing the performance of the entire system.

Although the aforementioned embodiment shows the DRX operation of the UE for example, the proposed invention is applicable to a DRX operation of a machine to machine (M2M) device or a machine-type communication (MTC) device. MTC is one type of data communication including one or more entities not requiring human interactions. That is, the MTC refers to the concept of communication performed by a machine device, not a terminal used by a human user, by using the existing wireless communication network. The machine device used in the MTC can be called an MTC device. There are various MTC devices such as a vending machine, a machine of measuring a water level at a dam, etc.

Figure 10:
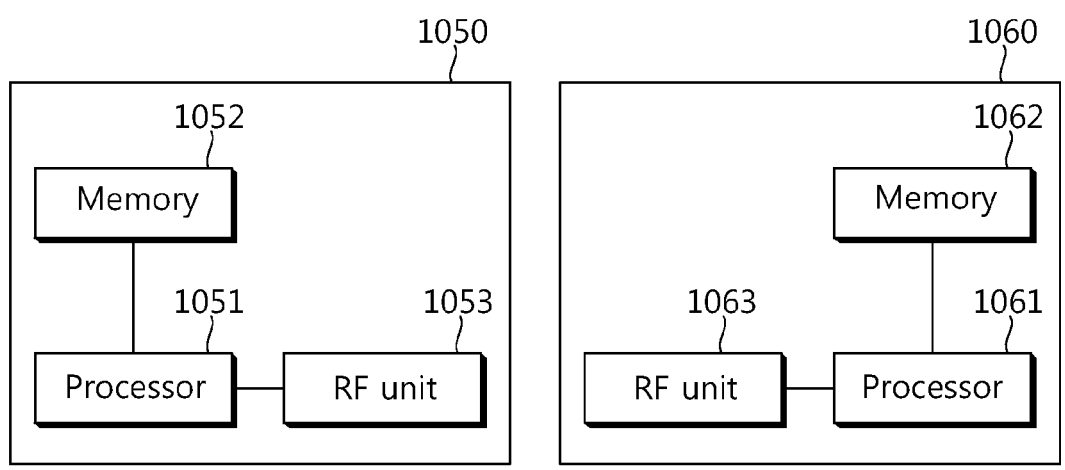
FIG. 10 shows a block diagram showing a wireless communication system according to an exemplary embodiment of the present invention.

FIG. 10 is a block diagram showing a wireless communication system according to an embodiment of the present invention.

A BS 1050 includes a processor 1051, a memory 1052, and a radio frequency (RF) unit 1053. The memory 1052 is coupled to the processor 1051, and stores a variety of information for driving the processor 1051. The RF unit 1053 is coupled to the processor 51, and transmits and/or receives a radio signal. The processor 1051 implements the proposed functions, procedures, and/or methods. In the embodiments of FIG. 8 to FIG. 10, the operation of the BS can be implemented by the processor 51.

Especially, the processor 1051 configures and sets the DRX configuration and CSI transmission configuration with CQI masking on the UE. Herein, the DRX configuration is included to set to UE with both the Short DRX cycle and the Long DRX cycle. This processor 1051 controls CSI transmission configuration to UE in order to correctly perform CSI report at specific subframe during On Duration configured for the CSI transmission configuration with CQI masking under the environment of performing the DRX operation.

The processor 1051 also estimates that the UE can change to the Long DRX cycle or keep the short DRX cycle for clear DRX operation in consideration of the running of the drx-Inactivity timer or not when the drx-ShortCycle timer expires, so that the processor 1051 also receives the CSI report at the specific subframe On Duration determined according to the changed or maintained DRX configuration at the UE.

A wireless device 1060 includes a processor 1061, a memory 1062, and an RF unit 1063. The memory 1062 is coupled to the processor 1061, and stores a variety of information for driving the processor 1061. The RF unit 1063 is coupled to the processor 1061, and transmits and/or receives a radio signal. The processor 1061 implements the proposed functions, procedures, and/or methods. In the embodiments of the FIG. 8 to FIG. 10, the operation of the UE can be implemented by the processor 1061.

Especially, the processor 1061 configures the DRX configuration and the CSI transmission configuration by checking a RRC signaling received by the RF unit 1063. Herein, the DRX configuration is included the state where both the Short DRX cycle and the Long DRX cycle are configured. This processor 1061, in order to correctly perform CSI report at On Duration configured for transmission under the environment of performing the DRX operation, i.e., configured with CQI masking, can selectively control transition of DRX cycle in consideration that the drx-Inactivity timer is running or not if the drx-ShortCycle timer which has been running by using the Short DRX cycle expires.

The processor 1061 determines to change to the Long DRX cycle or keep the short DRX cycle for clear DRX operation in consideration of the running of the drx-Inactivity timer or not when the drx-ShortCycle timer expires. The processor 1061 also determines to CSI report at the specific subframe On Duration determined according to the changed or maintained DRX cycle. Therefore, the processor 1061 controls to perform CSI transmission at the On Duration interval determined with the Short DRX cycle in order to provide channel state reports to the BS to when it is need to receive radio resource allocation information for the data transmission/reception with effect.

Therefore, more clear and correct DRX operation in consideration of data traffic is provided, in addition to more frequent CSI reports to be allocated radio resource allocation information with more proper.

Meanwhile, if the drx-Inactivity timer is not running is checked, the processor 1061 determines that continuously radio resource allocation information via at least one PDCCH for data transmission from the BS not is not received, and transition to the Long DRX cycle from the Short DRX cycle is made.

The technical concept of the present invention is based on provisional documents as described in the below.

<start of priority document>

In this invention, to send sufficiently frequent CQI/PMI/PTI/RI reports during the drx-Inactivity timer is running, the UE forbids the DRX Cycle transition from the Short DRX Cycle to the Long DRX Cycle when there is on-going data transmission.

Invention 3.1: Selective DRX Cycle change.
The eNB configures to the UE,
the DRX functionality including the Short DRX cycle and the Long DRX Cycle,
CQI reports including CQI masking
When the UE is configured with the DRX functionality,
The UE uses the short DRX cycle;
The UE starts drx-ShortCycle timer.
The UE uses the long DRX cycle at the expiry of drx-ShortCycle timer.
If the UE receives the PDCCH indicating a new transmission in UL or DL,
The UE starts or restarts drx-Inactivity timer.
When drx-ShortCycle timer expires,
The UE checks if drx-Inactivity timer is running
If drx-Inactivity timer is running, the UE uses the Short DRX Cycle
Else, the UE uses the Long DRX Cycle.
The UE applies the CQI masking configuration.
The UE applies the CQI masking and reports CQI/PMI/RI/PTI on PUCCH when onDurationTimer is running.
When the drx-Inactivity timer expires,
The UE starts drx-ShortCycle timer.
The UE uses Short DRX Cycle.
Then, when drx-ShortCycle timer expires, the UE uses the Long DRX Cycle.
Invention 3.2: The UE stops drx-ShortCycle timer.
The eNB configures to the UE,
the DRX functionality including the Short DRX cycle and the Long DRX Cycle,
CQI reports including CQI masking
When the UE is configured with the DRX functionality,
The UE uses the short DRX cycle;
The UE starts drx-ShortCycle timer.
The UE uses the long DRX cycle at the expiry of drx-ShortCycle timer.
If the UE receives the PDCCH indicating a new transmission in UL or DL,
The UE starts or restarts drx-Inactivity timer.
The UE uses the Short DRX Cycle.
The UE stops drx-ShortCycle timer, if running;
The UE applies the CQI masking configuration.
The UE applies the CQI masking and reports CQI/PMI/RI/PTI on PUCCH when onDurationTimer is running.
When the drx-Inactivity timer expires,
The UE uses Short DRX Cycle.
The UE starts drx-ShortCycle timer.
Then, when drx-ShortCycle timer expires, the UE uses the Long DRX Cycle.

Text Proposal: TS36.321
For invention 1:
When DRX is configured, the UE shall for each subframe:
if a HARQ RTT Timer expires in this subframe and the data of the corresponding HARQ process was not successfully decoded:
start the drx-RetransmissionTimer for the corresponding HARQ process.
if a DRX Command MAC control element is received:
stop onDurationTimer;
stop drx-Inactivity timer.
if drx-Inactivity timer expires or a DRX Command MAC control element is received in this subframe:
if the Short DRX cycle is configured:
start or restart drx-ShortCycle timer;
use the Short DRX Cycle.
else:
use the Long DRX cycle.
if drx-ShortCycle timer expires in this subframe and if the drx-Inactivity timer is not running
use the Long DRX cycle.
If the Short DRX Cycle is used and [(SFN*10)+subframe number] modulo (shortDRX-Cycle)=(drxStartOffset) modulo (shortDRX-Cycle); or
*190—if the Long DRX Cycle is used and [(SFN*10)+subframe number] modulo (longDRX-Cycle)=drxStartOffset:
start onDurationTimer.
during the Active Time, for a PDCCH-subframe, if the subframe is not required for uplink transmission for half-duplex FDD UE operation and if the subframe is not part of a configured measurement gap:
monitor the PDCCH;
if the PDCCH indicates a DL transmission or if a DL assignment has been configured for this subframe:
start the HARQ RTT Timer for the corresponding HARQ process;
stop the drx-RetransmissionTimer for the corresponding HARQ process.
if the PDCCH indicates a new transmission (DL or UL):
start or restart drx-Inactivity timer.

when not in Active Time, type-0-triggered SRS [2] shall not be reported.
if CQI masking (cqi-Mask) is setup by upper layers:
when onDurationTimer is not running, CQI/PMI/RI/PTI on PUCCH shall not be reported.
else:
when not in Active Time, CQI/PMI/RI/PTI on PUCCH shall not be reported.
For invention 2:
When DRX is configured, the UE shall for each subframe:
if a HARQ RTT Timer expires in this subframe and the data of the corresponding HARQ process was not successfully decoded:
start the drx-RetransmissionTimer for the corresponding HARQ process.
if a DRX Command MAC control element is received:
stop onDurationTimer;
stop drx-Inactivity timer.
if drx-Inactivity timer expires or a DRX Command MAC control element is received in this subframe:
if the Short DRX cycle is configured:
start or restart drx-ShortCycle timer;
use the Short DRX Cycle.
else:
use the Long DRX cycle.
if drx-ShortCycle timer expires in this subframe:
use the Long DRX cycle.
If the Short DRX Cycle is used and [(SFN*10)+subframe number] modulo (shortDRX-Cycle)=(drxStartOffset) modulo (shortDRX-Cycle); or
if the Long DRX Cycle is used and [(SFN*10)+subframe number] modulo (longDRX-Cycle)=drxStartOffset:
start onDurationTimer.
during the Active Time, for a PDCCH-subframe, if the subframe is not required for uplink transmission for half-duplex FDD UE operation and if the subframe is not part of a configured measurement gap:
monitor the PDCCH;
if the PDCCH indicates a DL transmission or if a DL assignment has been configured for this subframe:
start the HARQ RTT Timer for the corresponding HARQ process;
stop the drx-RetransmissionTimer for the corresponding HARQ process.
if the PDCCH indicates a new transmission (DL or UL):
start or restart drx-Inactivity timer.
use the Short DRX Cycle.
stop drx-ShortCycle timer.
when not in Active Time, type-0-triggered SRS [2] shall not be reported.
if CQI masking (cqi-Mask) is setup by upper layers:
when onDurationTimer is not running, CQI/PMI/RI/PTI on PUCCH shall not be reported.
else:
when not in Active Time, CQI/PMI/RI/PTI on PUCCH shall not be reported.
<end of priority document>

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for a user equipment (UE) determining a Discontinuous Reception (DRX) cycle in a wireless communication system, the method comprising:
utilizing a short DRX cycle while a DRX short cycle timer is running, the short DRX cycle shorter than a long DRX cycle;
determining whether a DRX inactivity timer is running when the DRX short cycle timer expires; and
transmitting data to a base station (BS) based on the short DRX cycle when it is determined that the DRX inactivity timer is running even when the DRX short cycle timer expires.

2. The method of claim 1, further comprising transmitting the data to the BS based on the long DRX cycle if it is determined that the DRX inactivity timer is not running.

3. The method of claim 1, wherein determining whether the DRX inactivity timer is running comprises:
determining whether the DRX inactivity timer is running at a subframe n when the DRX short cycle timer expires at the subframe n.

4. The method of claim 1, further comprising transmitting data for at least a Channel Quality Indicator (CQI), a Precoding Matrix Index (PMI), a Rank Indicator (RI) or a -Precoding Type Indicator (PTI) on a Physical Uplink Control Channel (PUCCH) during an On Duration of the short DRX cycle if it is determined that the DRX inactivity timer is running.

5. The method of claim 1, further comprising transmitting data for at least a Channel Quality Indicator (CQI), a Precodinq Matrix Index (PMI), a Rank Indicator (RI) or a Precoding Type Indicator (PTI) on a Physical Uplink Control Channel (PUCCH) during an On Duration of the long DRX cycle if it is determined that the DRX inactivity timer is not running.

6. The method of claim 1, further comprising:
receiving Radio Resource Control (RRC) signaling including information related to the short DRX cycle and the long DRX cycle.

7. The method of claim 1, further comprising monitoring at least one physical downlink control channel (PDCCH) during an On Duration of the short DRX cycle.

8. A user equipment (UE) for determining a DRX (Discontinuous Reception) cycle in a wireless communication system, the UE comprising:

a radio frequency (RF) unit configured to receive a radio signal; and a processor operatively coupled with the RF unit and configured to:

utilize a short DRX cycle while a DRX short cycle timer is running, the short DRX cycle shorter than a long DRX cycle;

determine whether a DRX inactivity timer is running when the DRX short cycle timer expires; and control the RF unit to transmit data to a base station (BS) based on the short DRX cycle when it is determined that the DRX inactivity timer is running even when the DRX short cycle timer expires.

9. The UE of claim 8, wherein the processor is further configured to control the RF unit to transmit the data to the BS based on the long DRX cycle if it is determined that the DRX inactivity timer is not running.

10. The UE of claim 8, wherein determining whether the DRX inactivity timer is running comprises determining whether the DRX inactivity timer is running at a subframe n when a DRX short cycle timer expires at the subframe n.

11. The UE of claim 8, wherein the processor is further configured to control the RF unit to transmit data for at least a Channel Quality Indicator (CQI), a Precoding Matrix Index (PMI), a Rank Indicator (RI) or a Precoding Type Indicator (PTI) on a Physical Uplink Control Channel (PUCCH) is during an On Duration of the short DRX cycle if it is determined that the DRX inactivity timer is running.

12. The UE of claim 8, wherein the processor is further configured to control the RF unit to transmit data for at least a Channel Quality Indicator (CQI), a Precoding Matrix Index (PMI), a Rank Indicator (RI) or a Precoding Type Indicator (PTI) on a Physical Uplink Control Channel (PUCCH) during an On Duration of the long DRX cycle if it is determined that the DRX inactivity timer is not running.

13. The UE of claim 8, wherein the processor is further configured to control the RF unit to receive Radio Resource Control (RRC) signaling including information related to the short DRX cycle and the long DRX cycle.

14. The UE of claim 8, wherein the processor is further configured to monitor at least one physical downlink control channel (PDCCH) during an On Duration of the short DRX cycle.

* * * * *